C. K. MATTHEWS.
SPEED CHANGING DEVICE.
APPLICATION FILED NOV. 1, 1920.
1,420,272.
Patented June 20, 1922.
2 SHEETS—SHEET 1.
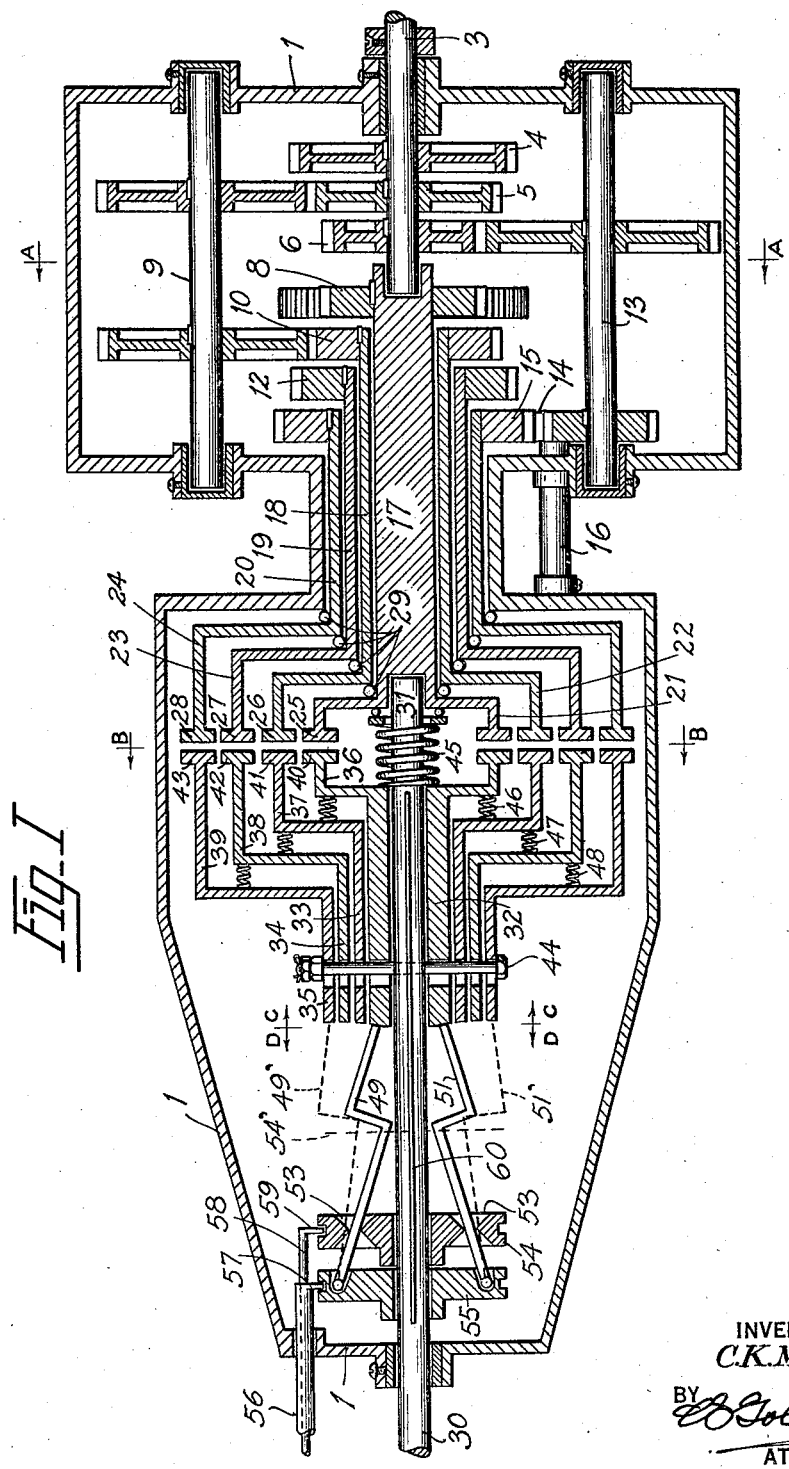
INVENTOR
C.K.Matthews.
BY
ATTORNEY

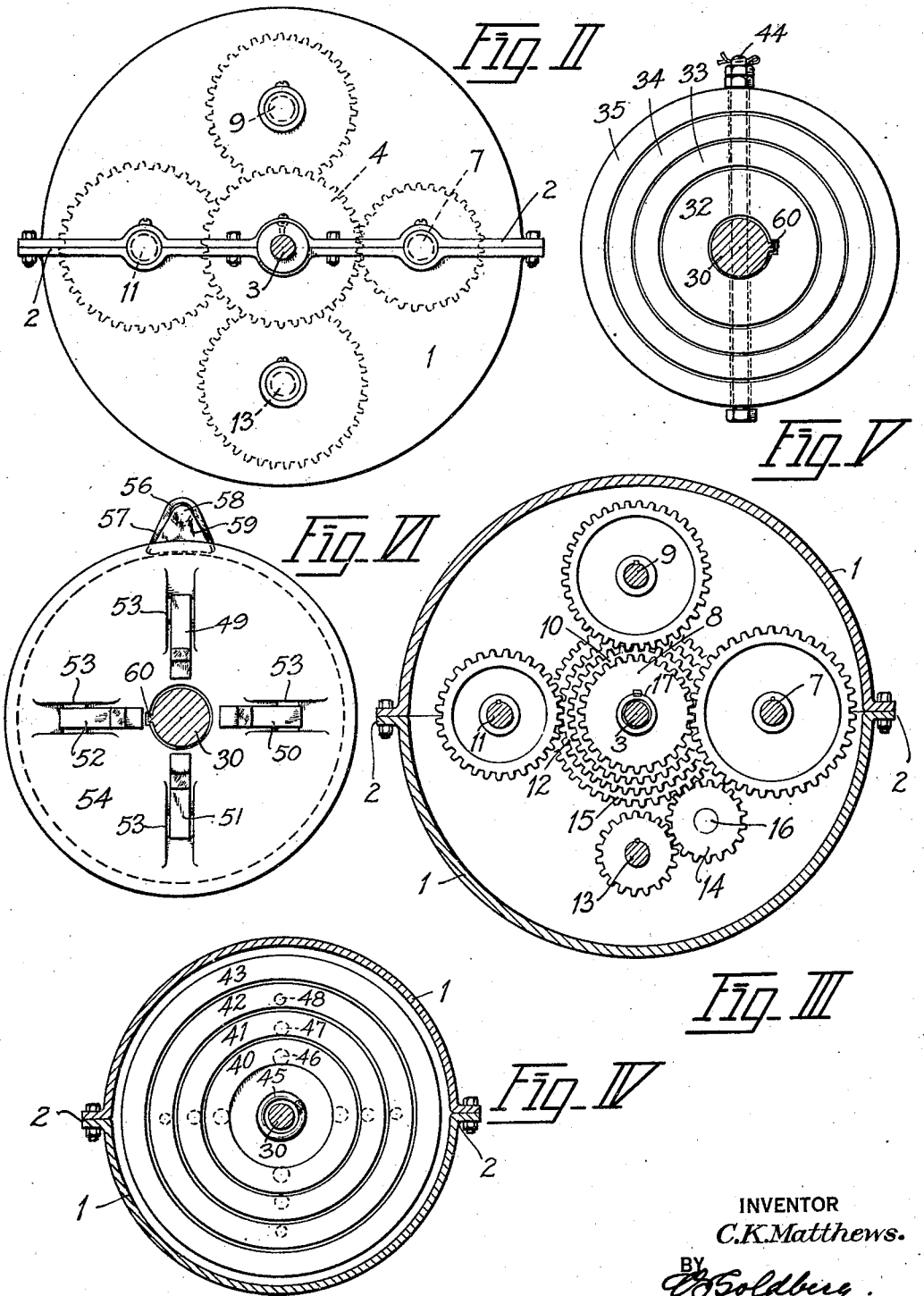

UNITED STATES PATENT OFFICE.

CHARLES K. MATTHEWS, OF PORTLAND, OREGON.

SPEED-CHANGING DEVICE.

1,420,272. Specification of Letters Patent. Patented June 20, 1922.

Application filed November 1, 1920. Serial No. 420,994.

*To all whom it may concern:*

Be it known that I, CHARLES K. MATTHEWS, a citizen of the United States, residing at Portland, in the county of Multnomah and State of Oregon, have invented a new and useful Speed-Changing Device, of which the following is a specification.

My invention relates to speed changing devices for automobiles in which, by a system of gears and clutches, the uniform speed of the engine shaft is transformed into a variable speed for the rear axle drive shaft.

The object of my invention is to produce a mechanism whereby speed changing without gear shifting may be accomplished.

I attain this object with the mechanism illustrated in the accompanying drawings, in which—

Fig. I is a longitudinal, vertical section through the entire apparatus.

Fig. II is an end elevation of Fig. I as seen from the engine.

Fig. III is a section through Fig. I along the line A—A.

Fig. IV is a section through Fig. I along the line B—B.

Fig. V is a section through Fig. I along the line C—C.

Fig. VI is a section through Fig. I along the line D—D.

Similar numerals refer to similar parts throughout the several views.

The upper and lower halves of a suitable housing 1 are joined at the horizontal center line by the flanges 2. Said housing is entered by the engine shaft 3, to the end of which are keyed the three gears—4, 5 and 6. Grouped around these gears are four counter shafts by which rotation is conveyed to four clutch gears in the following order: Gear 4 drives, through the counter shaft 7 (Fig. II) the clutch gear 8 (Fig. III); gear 5 drives, through the counter shaft 9, the clutch gear 10 (Figs. I, II and III); gear 6 drives, through the counter shaft 11, the clutch gear 12 (Figs. II and III), but gear 6, also drives, through the counter shaft 13 (Fig. I), the interposed pinion 14, and the clutch gear 15 whose direction of rotation the interposition of the pinion has reversed. The shaft which supports the pinion is indicated by the numeral 16.

The clutch gears 8, 10, 12 and 15 are keyed to the respective shafts 17, 18, 19 and 20, all revolubly mounted one into the other. Integrally connected to said shafts and nested into each other are the cylinders 21, 22, 23 and 24 whose edges are flanged to form the annular clutch faces 25, 26, 27 and 28.

The clutch faces are now grouped concentrically to each other, all within the same vertical plane, each one rotating at a different speed, clutch face 28 even rotating in reverse direction, and ball bearings 29 interposed at the proper places to take up the thrust against the clutch faces. The next problem is to transfer any of these rotations at will to the rear axle drive shaft 30 which enters the housing 1 opposite the engine shaft and has its end supported at 31 in the shaft 17. For this purpose the shaft 30 is provided with four sleeves—32, 33, 34 and 35, cylinders—36, 37, 38 and 39 on the sleeves, and the counter clutch faces—40, 41, 42 and 43 on the cylinders.

Since the sleeves are slotted and held slidably to the shaft 30 by means of the bolt 44 through shaft and slots, any one of the sleeves with its appertaining counter clutch face may be pressed against the opposing clutch face and thus transfer rotation to the shaft 30. The helical springs 45, 46, 47 and 48 disengage automatically the counter clutch faces from the clutch faces whenever forward pressure on the sleeve ceases.

The mechanism whereby selective pressure on the sleeves is accomplished forms the next subject of inquiry. It consists of four arms—49, 50, 51 and 52 (see also Fig. VI) which pass through openings 53 in the collar 54 and are pivotally secured in the collar 55. If collar 55 be held in its place and the collar 54 shifted forward then the free ends of said arms will be raised a proportionable distance until the desired sleeve has been reached. The dotted line 54' indicates the extreme position which the collar 54 may attain; the corresponding position for the arms is indicated by the dotted lines 49' and 51'.

As soon as the desired sleeve has been reached both collars—54 and 55 are pushed forward together and the counter clutch face will engage the proper clutch face.

The shifting of the collar 55 is accomplished either by hand or foot through the pipe 56 which enters the housing and engages with its flattened hook 57 an annular groove in the circumference of the collar.

The collar 54 is shifted similarly by a rod 58 which slides within the pipe 56, and has also a flattened hook 59 to engage an annular groove in the circumference of the collar 54. The grooves in the collars are necessary as pipe 56 and rod 58 do not rotate, while the key 60 in the shaft rotates the collars whenever one of the counter clutch faces engages the opposing clutch face.

I claim:

1. In a speed changing device, the combination of a housing, an engine shaft rotatably mounted in the housing, gears of varying diameter mounted on said engine shaft, a plurality of shafts revolvably mounted in each other and in the housing, a clutch face mounted at one end of each shaft, all clutch faces rotating within the same vertical plane, a gear mounted at the other end of each shaft, and counter shafts grouped around the last-named gears and the gears on the engine shaft to transmit continuous rotation at varying speed and direction from the latter to the former.

2. In a speed changing device, the combination of a housing, a plurality of concentric clutch faces rotatably mounted within said housing, all of said clutch faces rotating within the same vertical plane, an engine drive shaft within the housing, a plurality of counter clutch faces slidably mounted on said drive shaft, two collars slidably mounted on said shaft, a plurality of arms passing through one collar and pivoted within the other collar, said arms being adapted, on shifting of the collars, to engage the counter clutch faces selectively.

3. In a speed changing device, the combination of a housing, a rear axle drive shaft rotatably mounted in the housing, a plurality of sleeves sliding within each other and on the shaft, slots in the sleeves, a bolt through the slots and the drive shaft, cylinders integrally connected to one end of the sleeves, said cylinders being nested into each other, counter clutch faces at the ends of said cylinders, said counter clutch faces occupying the same vertical plane, means to shift each flange and its appertaining outer clutch face individually forward, and a plurality of springs acting on the sleeves to return said sleeves automatically to their original position.

4. In a speed changing device, the combination of a housing, a rear axle drive shaft, a plurality of sleeves mounted slidably within each other and on the shaft, a collar having an annular groove in the circumference and openings in the sides of said collar, a collar having a groove in the circumference and arms pivotally mounted in the sides of said collar, said arms passing through the openings of the first-named collar, and hooked rods engaging the grooves in said collars, whereby the free ends of said arms may engage and shift an individual sleeve.

Signed by me at Portland, Oregon, this 20th day of October, 1920.

CHARLES K. MATTHEWS.